United States Patent
Turner et al.

(10) Patent No.: US 11,149,945 B2
(45) Date of Patent: Oct. 19, 2021

(54) CORROSION RESISTANT AIR PREHEATER WITH LINED TUBES

(71) Applicants: Steve Turner, Wheaton, IL (US); Joe Ferguson, Robinson, IL (US); Brian Schifler, Sugar Grove, IL (US)

(72) Inventors: Steve Turner, Wheaton, IL (US); Joe Ferguson, Robinson, IL (US); Brian Schifler, Sugar Grove, IL (US)

(73) Assignee: Corrosion Monitoring Service, Inc., St. Charles, IL (US)

(*) Notice: Subject to any disclaimer, the term of this patent is extended or adjusted under 35 U.S.C. 154(b) by 835 days.

(21) Appl. No.: 13/907,262

(22) Filed: May 31, 2013

(65) Prior Publication Data
US 2014/0352931 A1    Dec. 4, 2014

(51) Int. Cl.
| F23L 15/04 | (2006.01) |
| F28F 9/26 | (2006.01) |
| F28F 21/08 | (2006.01) |
| F28D 21/00 | (2006.01) |
| F28F 19/00 | (2006.01) |
| F28D 7/16 | (2006.01) |

(52) U.S. Cl.
CPC ............ *F23L 15/04* (2013.01); *F28D 7/1623* (2013.01); *F28D 21/001* (2013.01); *F28F 9/26* (2013.01); *F28F 19/00* (2013.01); *F28F 19/002* (2013.01); *F28F 21/082* (2013.01); *F28F 2270/00* (2013.01); *Y02E 20/34* (2013.01)

(58) Field of Classification Search
CPC .......... F28F 13/14; F28F 19/00; F28F 19/002; F28F 21/082; F28F 9/26; F28F 2270/00; F23L 15/04; F28D 21/001; F28D 7/1623; Y02E 20/34; F22B 31/08

USPC ................................................. 165/135, 921
See application file for complete search history.

(56) References Cited

U.S. PATENT DOCUMENTS

| 2,735,660 A * | 2/1956 | Craig ...................... F23L 15/04 110/304 |
| 2,838,287 A * | 6/1958 | Kuhner .................. F28F 21/006 165/178 |
| 2,854,220 A * | 9/1958 | Vaughan .................. F22B 31/08 165/104.31 |

(Continued)

FOREIGN PATENT DOCUMENTS

JP    S59137794 A  *  8/1984  ............ F28F 19/002

OTHER PUBLICATIONS

Dewpoint Corrosion of a Coastal Biomass Power Boiler Air Heater.
(Continued)

*Primary Examiner* — Harry E Arant
(74) *Attorney, Agent, or Firm* — Rockman Videbeck & O'Connor

(57) ABSTRACT

A dew point corrosion resistant heat exchanging system having a plurality of hollow heat transferring tubes through which cooler ambient air or hot combustion product gasses flow. The other of the air or gas flows across the outer surfaces of the tubes, and heat is transferred from the hot gasses to the ambient air, thus heating the air. A portion of the tubes includes an inner liner forming an air pocket chamber between the liner and the outer wall of the tube. The air pocket chamber provides heat transfer advantages that maintain the tubes at a temperature above the dew point of the gasses in the system, thus inhibiting corrosion of the tubes.

11 Claims, 5 Drawing Sheets

(56) References Cited

U.S. PATENT DOCUMENTS

| | | | |
|---|---|---|---|
| 3,170,512 A | | 2/1965 | Smith |
| 3,802,497 A | * | 4/1974 | Kummel et al. ........ B01D 51/10 165/158 |
| 4,029,142 A | * | 6/1977 | Van Beukering ........ F02G 1/057 165/104.26 |
| 4,034,803 A | * | 7/1977 | Reed et al. ............. F23L 15/04 165/103 |
| 4,191,246 A | * | 3/1980 | Cassell ................... F22B 1/023 165/134.1 |
| 4,371,027 A | * | 2/1983 | Jacobsen ................ F28D 7/024 165/230 |
| 4,483,391 A | | 11/1984 | Gilbert |
| 4,646,816 A | * | 3/1987 | Rothstein ................ F16L 55/13 138/89 |
| 4,693,233 A | | 9/1987 | Meith |
| 4,858,684 A | * | 8/1989 | Brucher et al. .......... F28F 9/22 165/134.1 |
| 5,400,588 A | * | 3/1995 | Yamane et al. .......... F02C 3/22 165/146 |
| 7,681,922 B2 | | 3/2010 | Galatello Adamo |
| 2004/0191709 A1 | * | 9/2004 | Miller .................... F23J 15/003 431/4 |
| 2012/0073483 A1 | * | 3/2012 | Ojanpera ............... F28F 19/002 110/302 |
| 2013/0062044 A1 | | 3/2013 | Nickull |

OTHER PUBLICATIONS

Water Purification Handbook, Cold End Deposition and Corrosion Control.
Babcock & Wilcox Economizers and Air Heaters.
Hydrocarbon Processing, Cold end corrosion: causes and cures.

* cited by examiner

CORROSION RESISTANT AIR PREHEATER WITH LINED TUBES

FIELD OF THE INVENTION

The present invention relates to the structure and design of an apparatus providing heat exchange between relatively hot gas and relatively cold air in air preheaters for a fired burner. More specifically, the invention is concerned with heat transfer from the hot exhaust gasses that contain corrosive content, such as sulfur and other chemicals, to the cool air while preventing corrosion of the metal heat transferring tubes. The heated air is utilized for combustion purposes.

BACKGROUND OF THE INVENTION

An air preheater is a device generally designed to heat air prior to using the air for combustion in a combustion fired heating system, such as a boiler. The primary objective of an air preheater is to increase the thermal efficiency of the process. Air preheaters are commonly used in large boilers found in thermal power stations producing electric power from, e.g. fossil fuels, biomasses or waste. Preheating the air can be achieved by utilizing the heat from the exhaust gasses in the flue. Air preheaters recover the heat from the boiler flue gas which increases the thermal efficiency of the boiler by adding heat to the combustion air.

A tubular type of air preheater for use in steam generators in thermal power stations consists of straight tube bundles which extend through the gas outlet or air inlet ducting of the boiler, which tubes are open at each end outside of the ducting. The tubes are located inside the ducting, and the hot furnace exhaust gasses pass through or around the preheater tubes, transferring heat from the exhaust gas to the air inside the preheater. Ambient air is forced by a fan through a first end of the ducting located at one end of the preheater tubes, and the heated air emerges into another set of ducting, which carries the heated air to the boiler furnace for combustion.

The most common flow arrangement for the tubular air preheater is counterflow with gas passing vertically through the tubes and air passing horizontally in one or more passes outside of and in contact with the tubes.

Generally known preheater units comprise a plurality of heat exchange tubes that are placed horizontally in the flue gas duct. The heat exchange units on different height levels are connected to each other by air ducts located outside the flue gas duct. In other configurations the flue gas flows are inside the heat exchange tubes, and the heat exchange tubes are vertical.

In either configuration, the temperature of the ambient air at the inlet side of the preheater unit is significantly lower than at the air outlet side. The cold ambient air at the inlet side can cause a considerable cooling effect, due to the heat transfer coefficient of the air flow at the point of inflow being substantially higher compared to the developed flow deeper in the air duct. Moreover, the ambient air forced across the heat exchange tubes is not substantially warmed at the point of inflow into the heat exchanger.

This strong cooling of the metal heat exchange tubes at the air inlet can cause the surface of the heat exchange unit at the inlet end to drop below the acid dew point of chemicals in the flue gasses in contact with the tubes. One of the most serious problems with tubular air preheaters is dew point corrosion. If the metal temperature within the tubes drops below the acid saturation temperature, usually between 190° F. (88° C.) and 230° F. (110° C.), but sometimes at temperatures as high as 325° F. (169° C.), then the risk of dew point corrosion damage to the tubes from the chemicals in the flue gas becomes considerable. For example, the dew point of hydrochloric acid (HCl) is around 175° F., sulfuric acid ($H_2SO_4$) is around 325° F., and phosphoric acid ($H_3PO_4$) is around 225° F. The low temperatures throughout the operating cycle create an extremely corrosive environment for all the commonly used types of carbon steel tubes. When the service life of the air preheater tubes falls to less than five years, the operation and maintenance cost of the air preheater dramatically diminishes the gross margin of the entire operating facility.

Tube failures caused by high corrosion rates allow combustion air to short-circuit the boiler and go directly up the chimney. The induced draft and forced draft fan amperage is increased to push/pull more air through the system until the boiler capacity decreases due to the lack of combustion air reaching the boiler. Also, all of the downstream pollution control systems are negatively affected and the most, if not all, of the environmental headroom is lost. Both of these effects can force the unit to be taken off line to plug tube failures or clean the air heater. The tube failures and fouling force the boiler to 1) burn more fuel; 2) reduce the net electricity sold because the increased fan load creates parasitic losses; 3) increase the amount of greenhouse gasses entering the environment; and 4) decrease the gross margin of the facility.

To overcome the described dew point corrosion problem, it is common in the industry to either add more steam or gas air preheaters upstream of the tubular air heater, or to substitute the tube metallurgy to a more corrosion resistant material. If one chooses to add preheaters upstream of the air heater, these preheaters are typically used at startup and low load to increase the air inlet temperature. In most air heaters the metal temperature is above the acid dew point at full load. In the subset of tubular air heaters, the acid dew point occurs downstream in the pollution control systems. This method consumes significantly more energy to preheat the incoming ambient air in the heat exchange system.

The most common materials used to substitute for carbon steel to make the heat exchange tubes are austenitic stainless steel, and martensitic stainless steel. These stainless steels all have low thermal conductivity. This causes the slow heating of the metal tubes, causing the tubes to "sweat" and trap fly ash during the operation of the system. The ashes can quickly fill the tubes, eventually requiring removal of the tubes from service. The austenitic stainless steels also have a high coefficient of thermal expansion. This causes the heat exchange tubes to crack near the tube sheets after repeated cycling.

There lacks a durable apparatus and method for resolving the dew point corrosion problem effectively and still maintain the thermal efficiency of the heat exchanger in the system.

SUMMARY OF THE INVENTION

The present invention uses a low-cost, double-wall carbon steel tubing structure to reduce corrosion rates and significantly reduce fly ash fouling by raising the metal temperature of heat exchanger tubes above the acid dew points of the corrosive species present in the exhaust gasses. The system utilizes inner liners together with the outer tube structure to change the thermodynamics of the system and to maintain the temperature of the tubes above the dew points of the corrosive acids. The thermal efficiency of the system, however, is not significantly changed by using the newly structured tubes. The present invention also saves energy and improves the service life of the heat exchange tubes.

BRIEF DESCRIPTION OF THE DRAWINGS

The features of the present invention which are believed to be novel are set forth with particularity in the appended claims. The invention may best be understood from the following detailed description of currently illustrated embodiments thereof, taken in conjunction with the accompanying drawings wherein like numerals refer to like parts, and in which:

DETAILED DESCRIPTION OF THE INVENTION

In a common counterflow heat exchange system, the hot gasses and the ambient air to be heated are flowing in different directions during the exchange heat process. The hot gasses come into the system with a higher temperature and leave the system at a lower temperature. The ambient air comes into the system with a temperature lower than when the air leaves the system. A variety of single and multiple gas and air path arrangements are employed to accommodate plant layouts.

At the ambient air inlet end of the system in most of the present designs for preheaters, both the ambient air forced into the system and the hot exhaust gasses are typically at their lowest temperature point in the entire process, which is normally below the dew point for the corrosive chemicals in the exhaust gasses. This is also where all the dew point corrosion is most likely to take place. Also, in the scenario where the hot exhaust gas is still above the dew point, the temperature of the metal tubes may still be relatively cold. When the cold metal comes into contact with the corrosive vapors in the exhaust gasses, vapors condense as corrosive acid liquids to cause corrosion, and the liquid traps ashes.

Figure 1:
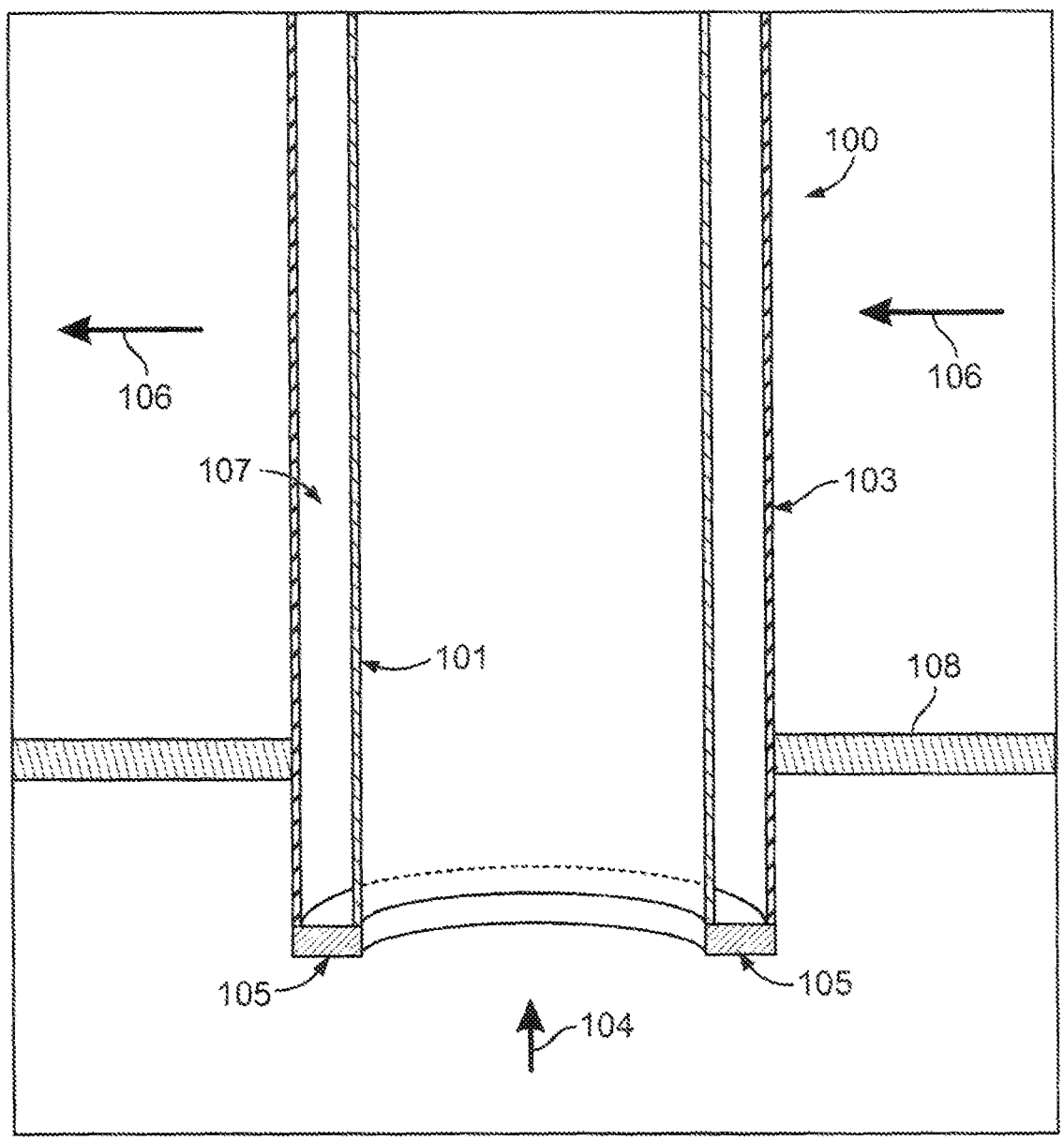
FIG. 1 is a vertical cross sectional view of one heat transferring tube with inner liner.

FIG. 1 shows a vertical cross sectional view of one heat transferring tube 100 in accordance with the present invention with inner liner 101. Having these liners 101 inside each of the heat exchange tubes 100 maintains the temperature of the metal surface of inner tube 103 above the dew point of the corrosive gasses, thereby reducing corrosion of the tube 100. To reduce the corrosion, the metal temperature of the heat transferring tubes that directly contact the exhaust gas streams, for example the inner liner 101, must remain above the dew point of the corrosive gasses which flow through the tube 100, as shown by the arrow 104. The inner liner 101 that is in direct contact with the exhaust gas streams and the outer tube 103 are both made from metal materials having high thermal conductivity, such as carbon steel. Air seals 105 at both ends of the inner liner 101, as explained with reference to FIG. 6, seal a portion of air 107 between inner liner 101 and outer tube 103, forming an air pocket chamber or intermediate layer in between the inner liner 101 and the outer body 103 of the tube 100. The ambient air flows outside of the outer body 103, as shown by arrows 106, and picks up heat by contacting the outer metal surface of the outer tube 103. A plurality of tubes 100 are held together in the heat exchanger by means of one or more tube sheets 108.

The inner liner 101 passes heat from the hot gasses in path 104 through the sealed air portion 107 to the outer surface of tube 103 by radiation. The outer surface of tube 103 can be sufficiently heated because of the high thermal conductivity of the materials used for the liner 101 and outer tube 103. The ambient air outside outer surface of the outer tube 103 picks up heat from contact with the outer surface of outer tube 103, instead of directly drawing heat from the inner liner 101. While the heat transfer from the outer surface of the outer tube 103 to the ambient air would be high, the presence of the intermediate layer of air 107 protects the inner liner 101 from too high a rate of heat loss and super cooling. This maintains the temperature of the metal surfaces of liner 101 contacting the exhaust gas above the dew point temperature. The use of inner liners 101 of a predetermined length, less than the length of the tubes 100, in only a small section of the tubes 100, such as section 210 in FIG. 2, section 314 in FIG. 3, and 414 in FIG. 4, relative to the size of the air preheater prevents corrosion of the tubes in those highly susceptible areas without significantly dropping the thermal efficiency of the heat exchange system because a large majority of the tubes in the air preheater do not include the inner liners 101. Therefore, the loss of efficiency to the air preheater as a whole is limited and is not significant because the inner liners 101 are placed in a limited, small section of the tubes 100.

Figure 2:
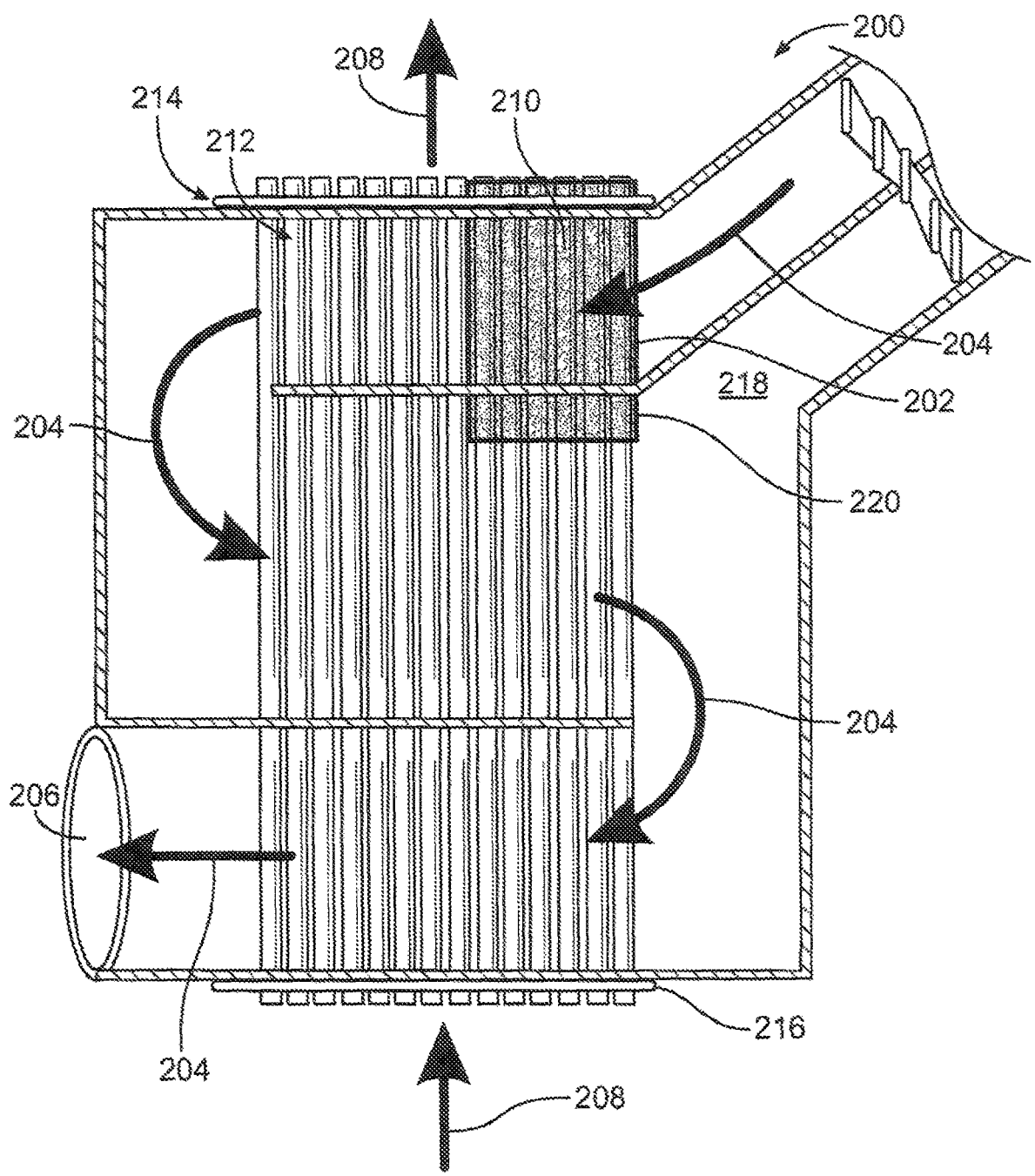
FIG. 2 is a schematic view of an embodiment of an air preheater where the air passes through multiple air paths.

FIG. 2 shows an embodiment of the air preheater system utilizing the present invention. In this embodiment, the ambient air to be heated is forced into the air preheater 200, usually by an air fan 201. The ambient air is directed into the system through an air inlet 202 and flows downward in accordance with the air flow path defined by arrows 204. The ambient air path 204 in the present embodiment has multiple interconnected paths. The cool ambient air entering the multiple paths of this embodiment passes around and over the tubes 212 several times through multiple paths downward. The air is heated by the transfer of heat from the hot gasses in tubes 212, and directed out of the system at air outlet 206, compared with the single air path system shown in FIG. 3, where the ambient air passes through a single path directly to the air outlet 306. In the embodiment of FIG. 2, when the cool ambient air flows downward adjacent the tubes 212, the air in path 204 contacts the outer surfaces of the heat transferring tubes 212 to pick up the heat, such that the air is warmed when it arrives at the air outlet 206. While the ambient air in path 204 picks up heat from the outer surfaces of tubes 212, the tubes are cooled by the flowing cool air and loss of heat to the air as the air is warmed. The warmed air is then supplied from outlet 206 as a source of oxygen for the combustion chemical reactions in the boiler heating system, as is known in the art.

The heat transferring tubes 212 are made from carbon steels that have high thermal conductivity. The heat transferring tubes 212 are aligned parallel to each other in the direction substantially perpendicular to the direction of air flow in air inlet 202. A top tube sheet 214 and a bottom tube sheet 216 hold the tubes 212 to maintain their positions. Each heat transferring tube 212 has a very thin outer wall, and the thin walls form conduits for the gasses to flow through the tubes 212. The hot exhaust gasses 208 enter into the tubes 212 of the air preheater 200 from the top or bottom, and flow inside the tubes 212 to the top of the preheater 200. The tubes 212 are heated as described in conjunction with the tube 100 shown in FIG. 1 by contact with the hot exhaust gasses 208.

There should be as rapid and as turbulent a flow of the ambient air to pick up as much heat as possible from the metal outer surfaces of the tubes 212. However, if the rapid heat capturing causes the outer surface temperature of tubes 212 to drop below the dew point, then, for example, the corrosive sulfur trioxide which is present in the gas 208 will condense as sulfuric acid and will cause corrosion. The outer surfaces of heat transferring tubes 212 adjacent to the ambient air inlet 202 have the highest rate of contact with the ambient cool air. Therefore, the tubes 212 adjacent to the air inlet 212 are lined with liners 101 (FIG. 1) to protect the tube surfaces contacting the hot gasses against corrosion.

Shaded area 210 in FIG. 2 illustrates where the inner liners 101 inside a plurality of heat transferring tubes 212 are located in accordance with the present invention. In the illustrated embodiment, all the cool air 204 entering into the system through the air inlet 202 will contact the shaded portion 210 of the tubes 212. The cool air picks up heat from outer surface of the tubes 212 instead of directly from the inner liners 101 (FIG. 1), and the inner liners 101 are protected from rapid heat loss and super cooling due to the air pocket formed in sealed air portion 107. As the cool air in path 204 picks up heat and the air flow is eventually warmed up to a point such that the surface temperature of the tubes 212 can be maintained above the dew point, the unlined tubes or unlined portions of tubes 212, as shown in the brighter areas in FIG. 2, are used to heat the air directly. To heat the ambient air to the appropriate temperature above dew point, the lined tubes 210, by calculation, should at least constitute one third of the total numbers of the heat exchanging tubes 212 in the first pass of air path 204, designated by shaded area 210.

The vertical length of the lined portion 210 of the tubes 212 extends at least no shorter than the width of the first air path 204 to fully contact all the cool air in path 204 entering the system through air inlet 202. The liners 101 do not terminate just at the lowest point of the air inlet 202, but extend further a short distance 220 toward the bottom of the tubes 212. The temperature of the metal tubes 212 at the bottom of distance 220 is above the dew point. The extended portion 220 of the liners 101 is to prevent the joint of lined and unlined portions of the tubes 212 adjacent to the lowest point of the air inlet 202 from forming a heat-sink at the bottom of liner 101. This heat sink is to be avoided since the sink would take heat from the metal surfaces of tubes 212, possibly causing the metal tube temperature to drop below the dew point. By calculation and experimentation, the liners 101 in the embodiment of FIG. 2 are usually extended approximately 12 inches further down from the lowest point of the first air path and into the second air path to prevent forming of a heat-sink. In a heat exchanger segment length of ten feet, the distance 220 could be four feet. An air bypass 218 may also be used to control the amount of cold air and further prevent cold end corrosion.

Figure 3:
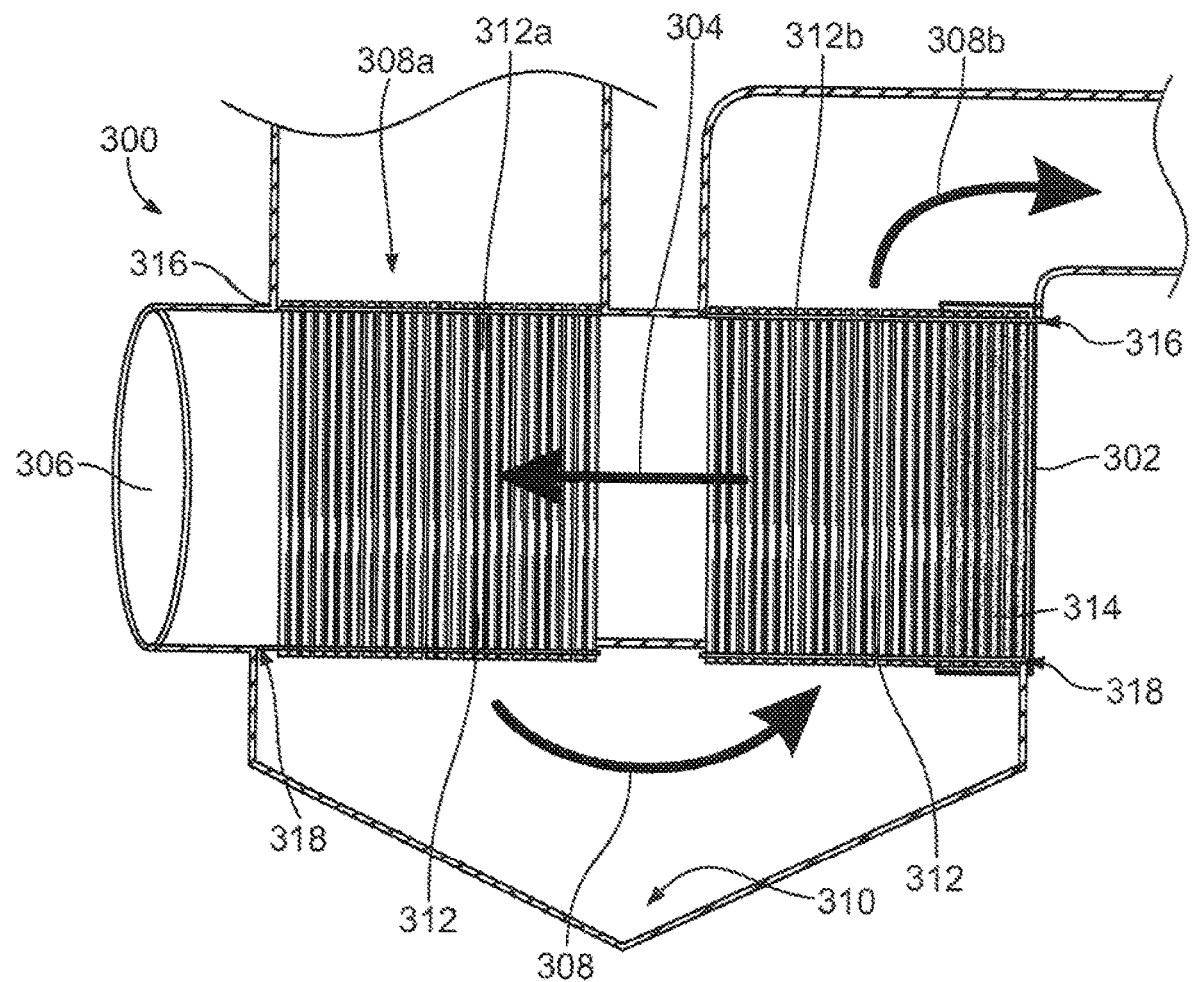
FIG. 3 is a schematic view of another embodiment of the air preheater where the air moves along a single air path.

FIG. 3 shows an embodiment of the present invention installed in a single air path preheater system. In this embodiment, the ambient air to be heated is forced into the air preheater 300, such as forced by an air fan 320, through an air inlet 302 and advances through a single path as illustrated by arrow 304 to the air outlet 306. When the cool ambient air flows in single air path 304, the air contacts outer surfaces of heat transferring tubes 312 to pick up the heat from the flue gasses, such that the air is warmed above the dew point when the air arrives at the air outlet 306. While the ambient air picks up heat from the tubes 312, the tubes are cooled by the flowing cool air. The warmed air is then supplied from outlet 306 as a source of oxygen for the combustion chemical reaction.

The hot exhaust gasses from boilers are directed into the air preheater 300 through the top of a first set of the heat exchanging tubes 312a as shown at the left side of FIG. 3. Arrow 308a in FIG. 3 shows the path for the hot gasses passing through the system: from the top end of the first set of tubes 312a to the bottom end of the first set of tubes, turning direction at the corner chamber 310, then entering the bottom end of a second set of tubes 312b, and finally exiting the system at 308b after passing through the top end of second set of tubes 312b. The exhaust gasses exiting the system 300 at 308b are cooled down as the heat from the gasses passes through the walls of heat exchanging tubes 312 to ambient air 304 flowing through the system.

Super cooling caused by rapid heat exchange can take place at the air inlet end 302 of the heat exchange system of FIG. 3. To prevent the temperature of the inner surfaces 103 (FIG. 1) of the metal tubes 312 from dropping below the dew point, inner liners 101 (FIG. 1) are equipped in the heat exchanging tubes near the air inlet 302 end of the preheater 300. Shaded area 314 in FIG. 3 shows the placement of lined tubes.

As explained in the description of FIG. 2, all the cool air coming into the system through the air inlet 302 in the embodiment of FIG. 3 will contact the lined tubes 312 in area 314 first before the air contacts unlined tubes 312 in the unshaded area. The cool air in inlet path 302 picks up heat from the outer surfaces of the lined tubes 312 in area 314, instead of directly from the inner liners 101 (FIG. 1). Therefore, the inner liners in area 314 are protected from rapid heat loss and super cooling. The inner surfaces of inner liners 101, that contact the corrosive vapors directly, are thus protected from corrosion, because the temperature of the liners is prevented from suddenly dropping. As the cool air advances through the system along path 304, the air picks up heat and warms up to a point where the outer surface temperature of the tubes 312a, b in the unshaded area can be maintained above the dew point. In this manner, the unlined tubes, as shown in the brighter areas in FIG. 3, are used to heat the air. To heat up the ambient air to the appropriate temperature in the embodiment of FIG. 3, the lined tubes in area 314, by calculation, should at least constitute one third of the total number of heat exchanging tubes 312a, b.

Figure 5:
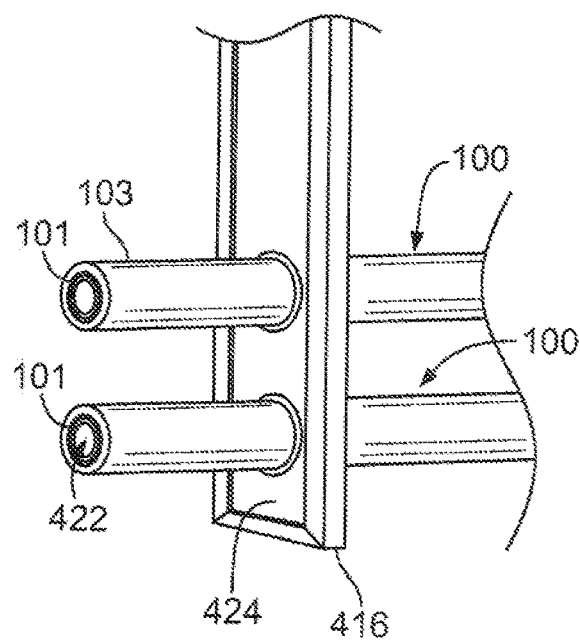
FIG. 5 is a detailed schematic illustration of the connection between the tube sheet and several tubes in the heat exchanger embodiment of FIG. 4.

The vertical length of the lined tubes in area 314 are fully extended no shorter than the width of air inlet 302 to fully contact all the cool ambient air entering the system. The liners 101 (FIG. 1) used in the embodiment of FIG. 3 are held by the top and bottom tube sheets 316 and 318. The inner liners 101 in the area 314 of the system of FIG. 3 extend throughout the axial length of the initial one third of the outer heat exchange tubes 312a as they are held by the top and bottom tube sheets 316 and 318. As shown in FIG. 5, the liners must extend above and below the respective tubesheets 316 and 318, so the layer of air extends through the tubesheet thicknesses.

Figure 4:
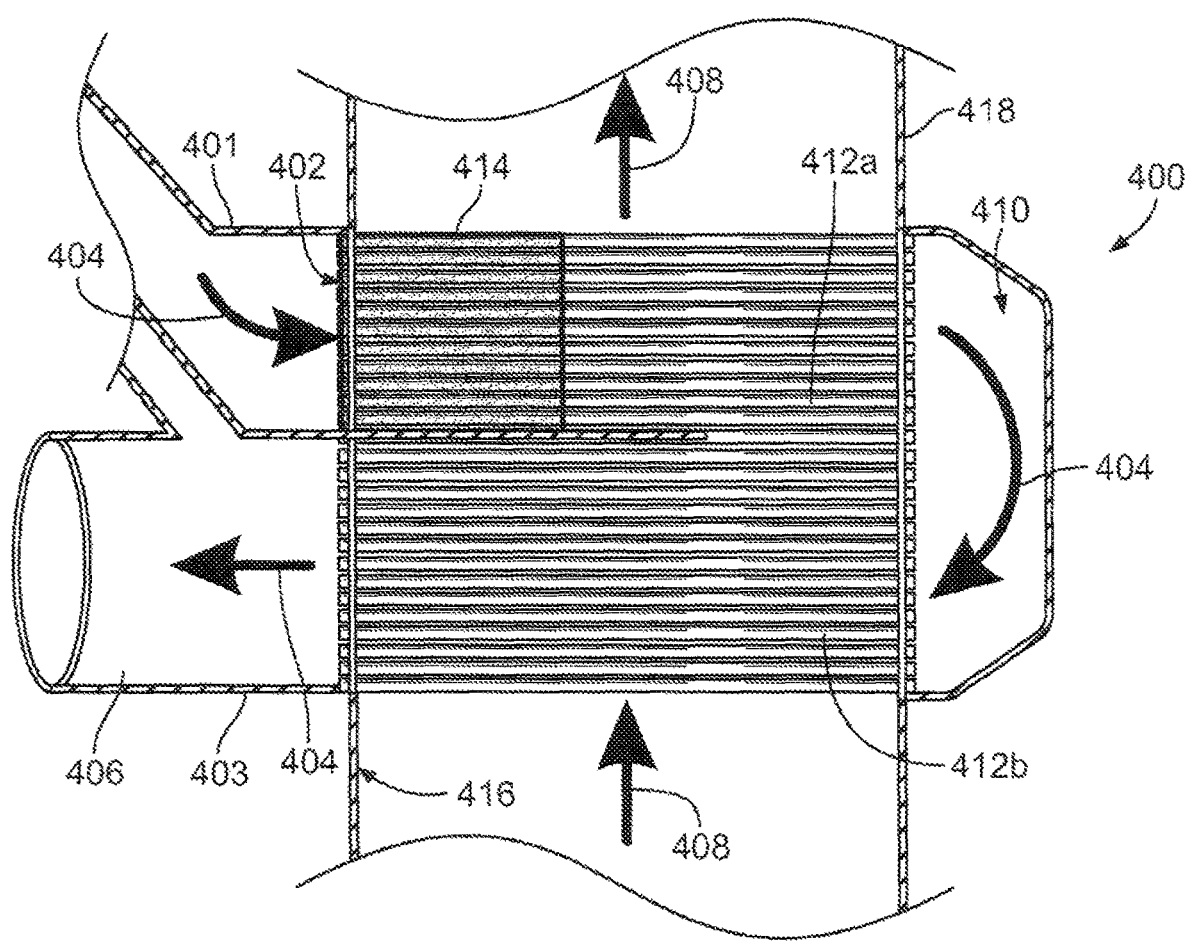
FIG. 4 is a schematic view of another embodiment of the air preheater where the hot exhaust gasses pass along the outside of the metal tubes, and the air passes through the hollow tubes of the preheater.

FIG. 4 illustrates an embodiment of the heater 400 having initial cool air, and ultimately warmer air passing through the tube conduits 401, 403 and the hot exhaust gasses passing outside the heat exchange tubes 412a, b located in the gas path 408. Heat exchange tubes 412a, b in this embodiment form ambient air conduits to initially direct cool air. Cool air is forced into an upper portion 414 of lined tubes 412 (shaded) by an air forcing device 420, such as an air fan. The air is heated after entering air inlet 402 due to contact with the upper portion 414 of the left end of the heat exchange tubes 412a, b. The initially cool air travels through the air preheating system and through tubes 412a,b along the path depicted by arrows 404. After the cool air enters the system 400 through the air inlet 402, the air comes out from the first set of heat transferring tubes 412a from the right end of tubes, and a cornered chamber 410 changes the air's direction of flow. The air then enters the right end of the second set of tubes 412b, and exits the system 400 from the left end of the second set of tubes 412b through the air outlet 406. The heat transferring tubes 412a, b are held horizontally parallel to each other by a left tube sheet 416 and a right tube sheet 418.

Hot exhaust gasses 408 enter into the system in the embodiment of FIG. 4 from the bottom and exit from the top. The gasses can also enter from the top and exit from the bottom. The hot exhaust gasses contact the outer surfaces of the tubes 412a, b and transfer the heat to the tubes. The heat is then transferred to the air inside the tubes and the air is heated. Dew point corrosion can occur when the cooled gas at the top end of the heat exchanger 400 in FIG. 4 contacts the portion of tubes 412a adjacent the entry of the initially cool air at air inlet 402.

All of the initially cool air forced into the heating system 400 by a fan passes through a portion of tubes 414 that are lined (FIG. 1). Tubes 412a in portion 414 first become sufficiently warmed by the hot gasses in path 404 to maintain the temperature of the metal tubes 412a above the dew point of the exhaust gas chemicals. The inner liners 101 (FIG. 1) are installed in the tubes 412a starting at the left end of the tubes, designated as portion 414, to receive the cold air. The inner liners 101 extend through a predetermined length of the tubes in portion 414 in the direction of the cool air's flow. A desired length of the liners in portion 414 of the embodiment in FIG. 4, by calculation, is approximately one third of the total length of the heat exchanging tubes 412. At this point, the temperature of the metal on the outside of the tubes 412a is sufficiently higher than the dew point temperature. Each tube 412a across the width of air inlet 402 is lined along the tube length distance so described.

Additional protections are provided to prevent corrosion of the cold end tube sheet 416 as well. Tube sheet 416 at the cold end in the embodiment shown in FIG. 4 could create a heat sink, causing corrosion at the joint of the tube sheet 416 and the tube 412a, even if the tube sheet does not contribute to the heat exchange between the cool air and hot gasses. When the cool air in path 404 contacts the tube sheet 416 adjacent air inlet 402, the tube sheet can pull or drain the heat from the lined tubes in portion 414. The intersection between the tubes portion 414 and the tube sheet 416 can be damaged because of the heat loss and contact with the hot gasses in path 408. To prevent this damage, the lined tubes in portion 414 extend outward from tube sheet 416 for a predetermined length from the tube sheet 416, and the tube sheet 416 itself may be covered by an insulation layer.

FIG. 5 illustrates the details of the tube sheet 416 in FIG. 4 showing the lined tubes 101 of portion 414 extending through the tube sheet 416 for approximately four inches to receive the cold air forced into the system from the air inlet 402 (FIG. 4). The inner liners 101 also extend with the outer tube surface 103 (FIG. 1) a predetermine distance from the tube sheet 416. The space between the inner liners 101 and the body of the outer surface 103 of tubes 100 are sealed at the left end 422 of the tubes 100 and liners 101. Also, a layer of insulated refractory material 424 is applied to the tube sheet 416, to further prevent heat loss from and damage to the tubes 100 and tube sheet 416.

Figure 6:
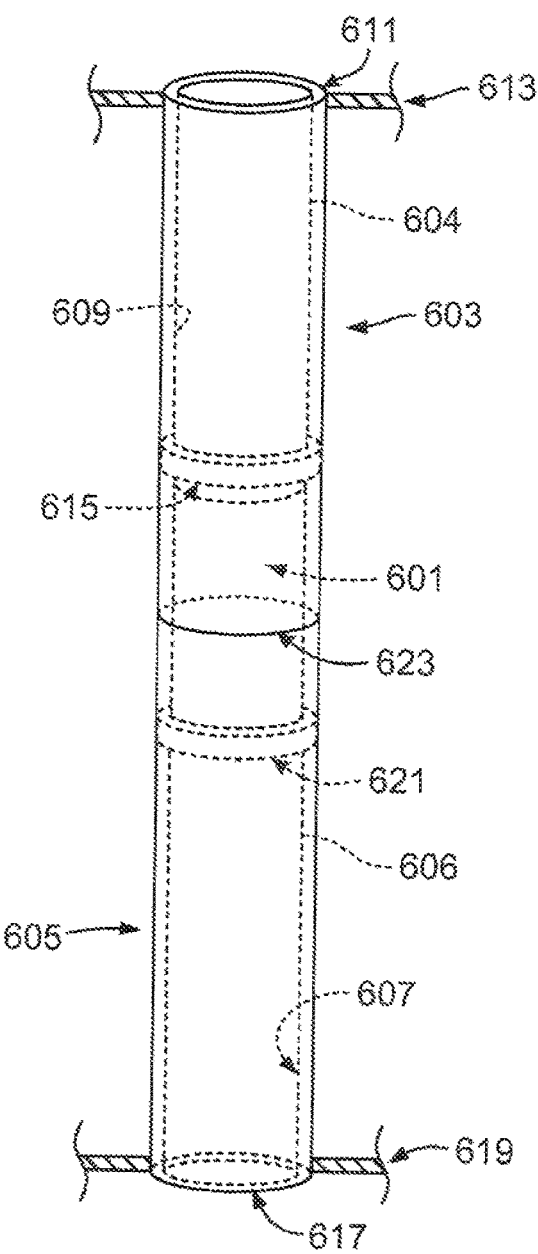
FIG. 6 is a front cross-section view of the extension member connecting two lined tubes.

FIG. 6 shows schematically an extension member 601 frictionally engaging the abutted ends of two lined tubes 603 and 605 when it is necessary to combine two or more tubes to meet a required length. Tubes 603 and 605 are the same as lined tube 101 of FIG. 1. The heat exchanging hollow tubes 603 and 605 are lined with inner liners 607 and 609. Likewise, the air in chamber 604 between inner liner 609 and the hollow tube outer body 603 is sealed at one end 611 adjacent the top tube sheet 613, and near the opposite end by a seal 615. The air in chamber 606 between inner liner 607 and hollow tube outer body 605 is sealed at one end by seal 617 adjacent the other tube sheet 619, and near the opposite end by seal 621.

To connect one end of tube 603 to an abutting end of tube 605, a hollow extension member 601 is partially and frictionally inserted into one end of tube 603. The remaining part of the extension member 601 is frictionally inserted into one end of tube 605. The connecting line 623 in FIG. 6 depicts where the two tubes 603 and 605 are in abutment and in contact with each other. The hollow extension member 601 frictionally engages both the top tube 603 and the bottom tube 605 to maintain the tubes together to achieve a desired length. The frictional engaging part of the hollow connector 603 is optionally configured to allow the gas or air to pass from hollow tube 603 to tube 605, while simultaneously forming a seal between the outer surface of the connector 601 and the inner walls of tubes 603 and 605.

While several particular embodiments of corrosive resistant air preheaters of the present invention have been shown and described, it will be apparent to those skilled in the art that changes and modifications may be made without departing from the true spirit and scope of the present invention. It is the intent of the appended claims to cover all such changes and modifications as fall within the true spirit and scope of the invention.

We claim:

1. A durable dew point corrosion resistant heat exchanging system for transfer of heat between a first gas and a second gas, comprising:
   a plurality of hollow heat transferring tubes comprising a subset of hollow heat transferring tubes, the plurality of hollow heat transferring tubes aligned parallel to each other in a first direction, the plurality of hollow heat transferring tubes extending between the first gas inlet and a first gas outlet, and the first gas making at least one pass over the plurality of hollow heat transferring tubes from the first gas inlet to the first gas outlet;
   the plurality of hollow heat transferring tubes adapted to direct the second gas through a second gas inlet and the plurality of hollow heat transferring tubes;
   the subset of hollow heat transferring tubes comprising at least one third of the hollow heat transferring tubes of the plurality of hollow heat transferring tubes and less than all of the hollow heat transferring tubes of the plurality of hollow heat transferring tubes;
   each hollow heat transferring tube of the subset of hollow heat transferring tubes comprising an inner liner inside a partial axial length of each hollow heat transferring tube of the subset of hollow heat transferring tubes, the subset of hollow heat transferring tubes and the inner liners being made of a metal material, the inner liner of each hollow heat transferring tube of the subset of hollow heat transferring tubes being sealed to each corresponding hollow heat transferring tube of the subset of hollow heat transferring tubes at both ends of the inner liner of the corresponding hollow heat transferring tube of the subset of hollow heat transferring tubes, each inner liner spaced from an inner wall of each corresponding hollow heat transferring tube of the subset of hollow heat transferring tubes, and forming a space between the inner liner and the inner wall of the corresponding hollow heat transferring tube of the subset of hollow heat transferring tubes, the space defining a sealed fluid chamber;

the sealed fluid chamber extending through a first tube sheet;

each inner liner having a first predetermined axial length extending at least a first width of a first pass of the at least one pass of the first gas; and wherein the subset of hollow heat transferring tubes and inner liners are arranged adjacent to the first gas inlet, the subset of hollow heat transferring tubes extending a predetermined width into the heat exchanging system in a second direction perpendicular to the first direction and along the first pass of the first gas, wherein a distance of the predetermined width comprises a minimum distance defined by a width of at least one third of the hollow heat transferring tubes of the plurality of hollow heat transferring tubes adjacent the first gas inlet.

2. The heat exchanging system of claim 1, wherein said sealed fluid chamber extends through a second tube sheet.

3. The heat exchanging system of claim 2, wherein each of said heat transferring tubes connects and extends through said first tube sheet and said second tube sheet.

4. The heat exchanging system of claim 1, wherein the sealed fluid chamber is configured to reduce a speed in which heat is transferred from the second gas through the inner liners to the first gas through the subset of hollow heat transferring tubes, wherein the first gas is ambient air and the second gas is hot exhaust gas from a combustion heating system, the first gas and the second gas having different temperatures, and wherein the sealed fluid chamber is configured to protect the inner liners from rapid heat loss and super cooling while maintaining a surface temperature of the plurality of hollow heat transferring tubes above an acid dew point of the second gas and allowing the plurality of hollow heat transferring tubes to heat the first gas to a first gas temperature above the acid dew point of the second gas.

5. The heat exchanging system of claim 4, wherein said first path of said first gas comprises a single air path.

6. The heat exchanging system of claim 1, wherein the at least one pass of the first gas comprises a plurality of interconnected air passes, and said predetermined width extends at least one third of the length of the first pass in the second direction of the first pass, the first pass adjacent the first gas inlet.

7. The heat exchanging system of claim 6, wherein each inner liner extends a second predetermined axial length beyond the first pass and partially into a second pass of the plurality of interconnected air passes, and wherein the first predetermined axial length of each inner liner is perpendicular to the second direction of the first pass.

8. The heat exchanging system of claim 1, wherein said first gas inlet comprises a bypass configured to control the volume of the first gas directed into the heat exchanging system.

9. The heat exchanging system of claim 1, wherein the first predetermined axial length of each inner liner is less than the axial length of each hollow heat transferring tube of the subset of hollow heat transferring tubes.

10. The heat exchanging system of claim 1, wherein the first predetermined axial length of each inner liner is at least a width of the first gas inlet.

11. The heat exchanging system of claim 1, wherein the metal material is carbon steel.

\* \* \* \* \*